No. 775,249.

Patented November 15, 1904.

UNITED STATES PATENT OFFICE.

EZEKIEL MASON ROBERTS, OF ATLANTA, GEORGIA.

BEVERAGE.

SPECIFICATION forming part of Letters Patent No. 775,249, dated November 15, 1904.

Application filed February 27, 1904. Serial No. 195,636. (No specimens.)

*To all whom it may concern:*

Be it known that I, EZEKIEL MASON ROBERTS, a citizen of the United States, and a resident of Atlanta, in the county of Fulton and State of Georgia, have invented a new and Improved Beverage, of which the following is a full, clear, and exact description.

My invention relates to beverages, my more particular object being to produce a beverage which simulates the bitter and pungent taste generally found in lager-beers, ales, &c., containing little or no ferment or fermentative product and made without the direct use of alcohol, malt, or hops.

The beverage in question may be dispensed after the manner of soda-water and to some extent used as a medicine.

It will be remembered that persons addicted to the use of alcoholic liquors frequently find it difficult to break off the drinking habit without the use of a beverage to be used as a substitute. My idea, therefore, is to prepare a harmless beverage which will to some extent satisfy the immediate cravings of all appetite and yet produce none of the distressing effects of the excessive use of intoxicating liquors. The beverage which I have thus prepared possesses nutrient and emollient elements when brought into contact with the contents of disordered stomachs so common to inebriates, so that the beverage if used by alcoholic victims exercises a beneficial and healthful effect independent of its harmless properties.

Aside from the results above accomplished my beverage can be dispensed in many States wherein the laws prohibit the sale of intoxicating liquors, and is also free from the operation of the revenue laws in so far as they may tax alcoholic beverages.

The beverage which I make is ready for drinking purposes as soon as prepared, being served as a soda-fountain beverage, but may be bottled or casked, if desired.

Chemically-pure glycerin, one gallon; gum-arabic, powdered, No. 1, not exceeding four pounds; cinchona alkaloid or salt—for instance, quinia or quinic sulfate—eighty grains; caffein, pure or citrated, not exceeding one-quarter pound, and coloring-matter sufficient to give the beer sought a color simulating that of lager-beer. This makes about five quarts of a semiliquid mass, in which form it may be shipped. By varying the respective quantities of gum-arabic and caffein I make two grades of the beverage. When I use comparatively small quantities of the gum-arabic and caffein—say one pound of the gum-arabic and one ounce of caffein—the admixture is clear and of the consistency of rock-candy syrup.
If desired, any harmless preservative may be added for the purpose of enabling the beverage to remain unaltered.

No particular skill is necessary in admixing the ingredients. They are merely stirred together, preferably with a gentle heat.

Having thus described my invention, I claim as new and desire to secure by Letters Patent—

A beverage of the character described, comprising chemically-pure glycerin, one gallon, pure gum-arabic No. 1, not exceeding four pounds, cinchona alkaloid or salt, eighty grains, caffein, not exceeding one-quarter pound, and an infinitesimal quantity of coloring-matter.

In testimony whereof I have signed my name to this specification in the presence of two subscribing witnesses.

EZEKIEL MASON ROBERTS.

Witnesses:
H. A. READ,
ARCHER M. REID.